United States Patent
Stephenson, III (10) Patent No.: US 7,525,606 B2
(45) Date of Patent: Apr. 28, 2009

(54) FIELD BLOOMING COLOR FILTER LAYER FOR DISPLAYS

(75) Inventor: Stanley W. Stephenson, III, Spencerport, NY (US)

(73) Assignee: Industrial Technology Research Institute, Hsinchu (TW)

(*) Notice: Subject to any disclaimer, the term of this patent is extended or adjusted under 35 U.S.C. 154(b) by 71 days.

(21) Appl. No.: 11/134,020

(22) Filed: May 20, 2005

(65) Prior Publication Data

US 2006/0262246 A1    Nov. 23, 2006

(51) Int. Cl.
G02F 1/1333   (2006.01)

(52) U.S. Cl. .............................. 349/40; 349/86; 349/113

(58) Field of Classification Search ................... 349/40, 349/86, 113
See application file for complete search history.

(56) References Cited

U.S. PATENT DOCUMENTS

| | | | |
|---|---|---|---|
| 3,600,060 A | | 8/1971 | Churchill et al. |
| 3,816,786 A | | 6/1974 | Churchill et al. |
| 4,420,224 A | * | 12/1983 | Kaufmann ................... 349/113 |
| 4,435,047 A | | 3/1984 | Fergason |
| 5,251,048 A | | 10/1993 | Doane et al. |
| 5,695,682 A | | 12/1997 | Doane et al. |
| 6,166,795 A | * | 12/2000 | Fujii et al. ................... 349/141 |
| 6,359,673 B1 | * | 3/2002 | Stephenson ................... 349/185 |
| 6,423,368 B1 | | 7/2002 | Stephenson et al. |
| 6,639,637 B2 | | 10/2003 | Stephenson |
| 6,690,447 B1 | | 2/2004 | Stephenson et al. |
| 6,707,517 B2 | | 3/2004 | Stephenson |
| 6,788,362 B2 | | 9/2004 | Stephenson |
| 2004/0032545 A1 | * | 2/2004 | Stephenson et al. ........... 349/86 |
| 2004/0246411 A1 | * | 12/2004 | Stephenson et al. ......... 349/113 |
| 2004/0246413 A1 | | 12/2004 | Stephenson et al. |
| 2006/0262245 A1 | * | 11/2006 | Burberry et al. ............... 349/86 |
| 2006/0262247 A1 | * | 11/2006 | Stephenson et al. ........... 349/86 |
| 2006/0262248 A1 | * | 11/2006 | Burberry et al. ............... 349/86 |

FOREIGN PATENT DOCUMENTS

| | | |
|---|---|---|
| EP | 1324106 | 7/2003 |
| EP | 1324106 A1 * | 7/2003 |
| EP | 1324107 | 7/2003 |
| GB | 2099169 | 12/1982 |
| WO | 2004/109382 | 12/2004 |

OTHER PUBLICATIONS

Pending U.S. Appl. No. 10/832,520, Martin et al., *CoatableConductive Layer*, filed Apr. 27, 2004.
Co-Pending U.S. Appl. No. 11/134,757, Stephenson et al., *Reflective Layer Field Blooming Layer For LC Display*.
Co-Pending U.S. Appl. No. 11/134,758, Burberry et al., *Controlled GAP States For Liquid Crystal Displays*.
Co-Pending U.S. Appl. No. 11/133,322, Burberry et al., *Conductive Layer To Reduce Drive Voltage In Displays*.

\* cited by examiner

*Primary Examiner*—David Nelms
*Assistant Examiner*—Phu Vu
(74) *Attorney, Agent, or Firm*—Alston & Bird LLP (57) ABSTRACT

The present invention relates to a display sheet comprising a substrate for carrying layers of material, an imaging layer comprising a bistable polymer dispersed cholesteric liquid crystal imaging layer, a first patterned transparent conductor disposed on one side of the bistable polymer dispersed cholesteric liquid crystal imaging layer, a field blooming color filter layer, and a second patterned electrode on the side of the bistable polymer dispersed cholesteric liquid crystal imaging layer opposite the first patterned conductor and a method for making the same.

19 Claims, 6 Drawing Sheets

FIELD BLOOMING COLOR FILTER LAYER FOR DISPLAYS

CROSS REFERENCE TO RELATED APPLICATIONS

Reference is made to commonly assigned, co-pending U.S. patent applications:

Ser. No. 11/133,822 by Burberry et al. filed of even date herewith entitled "Reflective Layer Field Blooming Layer For LC Display";

Ser. No. 11/134,758 by Burberry et al. filed of even date herewith entitled "Controlled GAP States For Liquid Crystal Displays"; and Ser. No. 11/132,701 by Burberry et al. filed of even date herewith entitled "Conductive Layer To Reduce Drive Voltage In Displays", incorporated herein by reference.

FIELD OF THE INVENTION

The present invention relates to a display sheet having a cholesteric liquid layer that can change states to provide a viewable image.

BACKGROUND OF THE INVENTION

Currently, information is displayed using assembled sheets of paper carrying permanent inks or displayed on electronically modulated surfaces such as cathode ray displays or liquid crystal displays. Printed information cannot be changed. Electrically updated displays are heavy and expensive. Other sheet materials can carry magnetically written areas to carry ticketing or financial information, however magnetically written data is not visible.

Media systems exist that maintain electronically changeable data without power. Such system can be electrophoretic (Eink), Gyricon or polymer dispersed cholesteric materials. An example of electronically updateable display can be found in U.S. Pat. No. 3,600,060 issued Aug. 17, 1971 to Churchill that shows a device having a coated then dried emulsion of cholesteric liquid crystals in aqueous gelatin to form a field responsive, bistable display. U.S. Pat. No. 3,816,786 discloses a layer of encapsulated cholesteric liquid crystal responsive to an electric field. The electrodes in the patent can be transparent or non-transparent formed of various metals or graphite. It is disclosed that one electrode must be light absorbing and it is suggested that the light absorbing electrode be prepared from paints contains conductive material such as carbon.

Fabrication of flexible, electronically written display sheets is disclosed in U.S. Pat. No. 4,435,047 issued Mar. 6, 1984 to Fergason. A substrate supports a first conductive electrode, one or more layers of encapsulated liquid crystals, and a second electrode of electrically conductive ink. The conductive inks form a background for absorbing light, so that the display areas appear dark in contrast to non-display areas. Electrical potential applied to opposing conductive areas operates on the liquid crystal material to expose display areas. Because the liquid crystal material is nematic liquid crystal, the display ceases to present an image when de-energized.

The patent discloses the use of dyes in either the polymer encapsulant or liquid crystal to absorb incident light. Nematic liquid crystal is used, which absorbs light and does not maintain an image in the absence of a field. The dyes are part of a solution, and not solid submicrometer particles. The patent further discloses the use of a chiral dopant in example 2. The dopant improves the response time of the nematic liquid crystal, but does not operate in a light-reflective state.

U.S. Pat. No. 5,251,048 discloses a light modulating cell having a polymer dispersed chiral nematic liquid crystal. The chiral nematic liquid crystal has the property of being electrically driven between a planar state reflecting a specific visible wavelength of light and a light scattering focal conic state. Chiral nematic liquid crystals, also known as cholesteric liquid crystals, have the capacity of maintaining one of multiple given states in the absence of an electric field. Black paint is applied to the outer surface of rear substrate to provide a light absorbing layer outside of the area defined by the intersection of segment lines and scanning lines.

U.S. Pat. No. 6,639,637 discloses a black field blooming layer disposed between a set of conductors and a polymer dispersed cholesteric layer. The field blooming layer is disposed between a polymer dispersed liquid crystal layer and a set of conductor to change the state of material between the conductors. The field blooming layer is made of submicron carbon particles in a gelatin binder. U.S. Pat. No. 6,707,517 discloses a field blooming layer made of polymer dispersed submicron particles of a transparent, electrically conductive polymer.

Cholesteric liquid crystals reflect a portion of the visible spectrum when in a high reflection state. It is preferable that the reflective state have neutral color balance. It would be useful to create neutral density reflective cholesteric displays. It would be useful for such display to be fabricated using simple, low cost processes. It would be of further use if such displays had a field blooming property which permitted field responsive optical state changes of cholesteric liquid crystal between conductors.

PROBLEM TO BE SOLVED

There remains a need for a reduced cost, display having excellent brightness, high contrast, and low switching voltage.

SUMMARY OF THE INVENTION

The present invention relates to a display sheet comprising a substrate for carrying layers of material, an imaging layer comprising a bistable polymer dispersed cholesteric liquid crystal imaging layer, a first patterned transparent conductor disposed on one side of the bistable polymer dispersed cholesteric liquid crystal imaging layer, a field blooming color filter layer, and a second patterned electrode on the side of the bistable polymer dispersed cholesteric liquid crystal imaging layer opposite the first patterned conductor and a method for making the same.

ADVANTAGEOUS EFFECT OF THE INVENTION

The present invention includes several advantages, not all of which are incorporated in a single embodiment. This invention provides a field blooming color filter layer for cholesteric displays. The field blooming color filter layer may optionally operate in conjunction with a reflective surface to provide complementary light in a polymer dispersed cholesteric display.

The present invention provides a bright, color neutral image. The display can be formed using simple, room temperature processes. Submicrometer particles of electrically conductive, transparent metal oxide and pigment particles provide a color filter layer which has field blooming capability with little effect on drive voltages. The color filter, field blooming layer may be coated simultaneous with a binder solution dispersed cholesteric liquid crystal.

DETAILED DESCRIPTION OF THE INVENTION

The present invention relates to a display sheet comprising a substrate for carrying layers of material, an imaging layer comprising a bistable polymer dispersed cholesteric liquid crystal imaging layer, a first patterned transparent conductor disposed on one side of said bistable polymer dispersed cholesteric liquid crystal imaging layer, a field blooming color filter layer, and a second patterned electrode on the side of said bistable polymer dispersed cholesteric liquid crystal imaging layer opposite said first patterned conductor.

Figure 1:
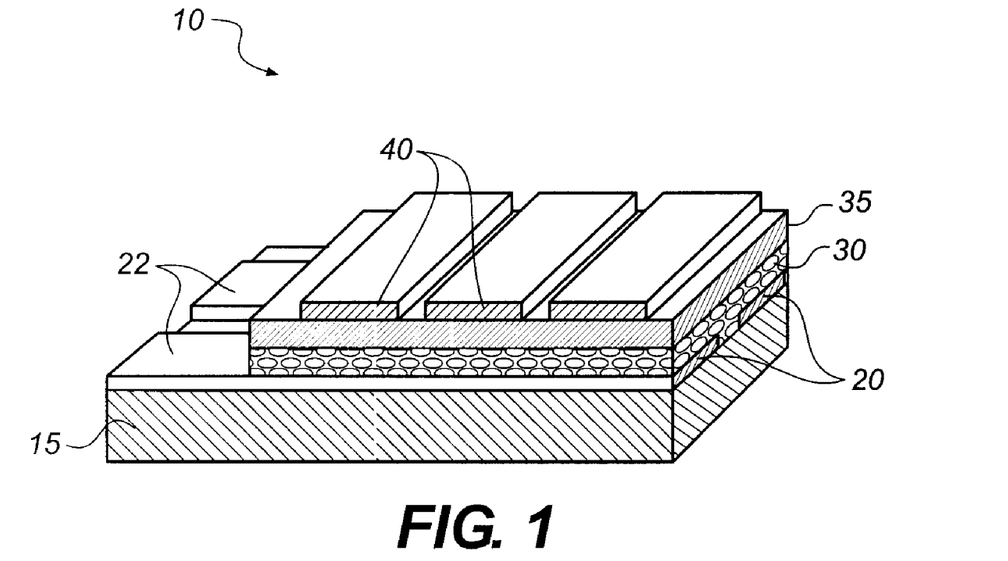
FIG. 1 is a perspective of a display in accordance with the present invention.

FIG. 1 is a perspective section view of one embodiment of a display in accordance with the invention, which display employs a polymer dispersed cholesteric material. A sheet designated as display 10 is made in accordance with the present invention. Display 10 includes a display substrate 15, which can be a thin transparent polymeric material. In an exemplary embodiment, display substrate 15 is a 125 micrometer thick sheet of polyester film base. Other polymers, such as transparent polycarbonate, may also be used.

One or more first transparent conductors 20 are formed on display substrate 15. First transparent conductors 20 comprise a set of adjacent traces organized to form the first set of traces for a matrix display. The gap between first conductors 20 is preferably kept as narrow as possible, while maintaining electrical isolation between adjacent conductors. A thin portion of cholesteric material lying in the conductor-free area will not respond to applied electrical fields. First transparent conductors 20 can be tin-oxide, indium-tin-oxide (ITO), with ITO being the preferred material. Typically the material of first transparent conductors 20 is sputtered or coated as a layer over display substrate 15 having a resistance of less than 1000 ohms per square. First transparent conductors 20 can be formed in the conductive layer by conventional lithographic or laser etching means. Transparent first transparent conductors 20 can also be formed by printing a transparent organic conductor such as PEDT/PSS, PEDOT/PSS polymer, which materials are sold as Baytron® P by Bayer AG Electronic Chemicals. Portions of first transparent conductors 20 can be uncoated to provide exposed first conductors 22.

Cholesteric layer 30 overlays first transparent conductors 20. Cholesteric layer 30 contains cholesteric liquid crystal material, such as those disclosed in U.S. Pat. No. 5,695,682 to Doane et al., the disclosure of which is incorporated by reference. Such materials are made using highly anisotropic nematic liquid crystal mixtures and adding a chiral doping agent to provide helical twist in the planes of the liquid crystal to the point that interference patterns are created that reflect incident light. Application of electrical fields of various intensity and duration can be employed to drive a chiral nematic (cholesteric) material into a reflective state, to a near-transparent or transmissive state, or an intermediate state. These materials have the advantage of having first and second optical states that are both stable in the absence of an electrical field. The materials can maintain a given optical state indefinitely after the field is removed. Cholesteric liquid crystal materials can be formed, for example, using a two component system such as MDA-00-1444 (undoped nematic) and MDA-00-4042 (nematic with high chiral dopant concentrations) available from E. M. Industries of Hawthorne, N.Y.

Cholesteric layer 30 may be, for example, E. M. Industries' cholesteric material BL-118 dispersed in deionized photographic gelatin. The liquid crystal material is mixed at 8% concentration in a 5% gelatin aqueous solution. The liquid crystal material is dispersed to create an emulsion having 8-10 micron diameter domains of the liquid crystal in aqueous suspension. The domains may be formed using the limited coalescence technique described in U.S. Pat. No. 6,423,368, incorporated herein by reference. The emulsion is coated on a polyester display substrate 15 over the first transparent conductor 20 and dried to provide an approximately 9-micron thick polymer dispersed cholesteric coating. Other organic binders such as polyvinyl alcohol (PVA) or polyethylene oxide (PEO) may be used in place of the gelatin. Such emulsions are machine coatable using coating equipment of the type employed in the manufacture of photographic films. A thin layer of gelatin may be applied over first transparent conductor 20 to provide an insulator prior to applying cholesteric layer 30 as disclosed U.S. Pat. No. 6,6904,471, incorporated herein by reference. Coatings made from such emulsions appear bright after coating.

Figure 2:
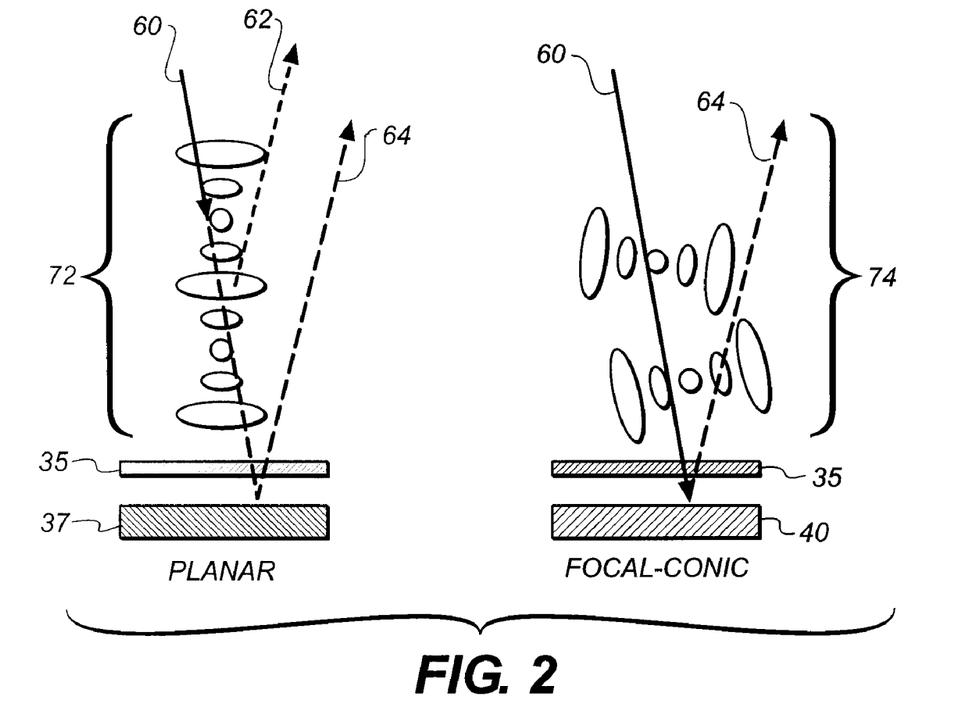
FIG. 2 is a schematic sectional view of a chiral nematic material, respectively, in a planar and focal conic state responding to incident light.

FIG. 2 is a schematic section view of optical states of one embodiment of a display in accordance with the present invention. The left diagram demonstrates the optical path when the cholesteric material is in a planar state. Incident light 60 strikes planar liquid crystal 72 which reflects a portion of incident light 60 as reflected light 62. The remaining light passes through field blooming color filter layer 35.

Field blooming color filter layer 35 is a light absorbing dye layer that operates on a portion of the light passing through field blooming color filter layer 35. Particular wavelengths of light are absorbed, and the remaining light strikes reflective second conductor 40. Light is reflected from reflective layer 37 and passes through field blooming color filter layer 35 a second time, then passes through planar material 72 to become complementary light 64. Complementary light 64 operating in conjunction with cholesteric liquid crystal having peak reflectance near 575 nanometers together can form a substantially color-neutral reflected light when cholesteric material is in planar state 72. Such pigments are disclosed in copending U.S. Patent Application No. USSN 2004/0246411, parent and CIP USSN 2004/0246413, hereby incorporated by reference.

Suitable pigments used in the color filter layer, also typically referred to as the color contrast layer, may be any colored materials, which are practically insoluble in the medium in which they are incorporated. The preferred pigments are organic in which carbon is bonded to hydrogen atoms and at least one other element such as nitrogen, oxygen and/or transition metals. The hue of the organic pigment is primarily defined by the presence of one or more chromophores, a system of conjugated double bonds in the molecule, which is responsible for the absorption of visible light. Suitable pigments include those described in Industrial Organic Pigments: Production, Properties, Applications by W. Herbst and K. Hunger, 1993, Wiley Publishers, incorporated herein by reference. These include, but are not limited to, Azo Pigments such as monoazo yellow and orange, diazo, naphthol, naphthol reds, azo lakes, benzimidazolone, diazo condensation, metal complex, isoindolinone and isoindolinic, polycyclic pigments such as phthalocyanine, quinacridone, perylene, perinone, diketopyrrolo-pyrrole, and thioindigo, and anthriquinone pigments such as anthrapyrimidine, triarylcarbonium and quinophthalone. The color of the layer may be adjusted to produce a particular result when combined with the absorption/reflection wavelengths of the liquid crystalline material. This may be referred to as a complementary color contrast layer. On the right side of FIG. 2, the liquid crystal material is in a focal conic state 74 and transmits incident light 60. Field blooming color filter layer 35 provides complementary light 64 when the liquid crystal material is in a focal conic state.

Figure 3:
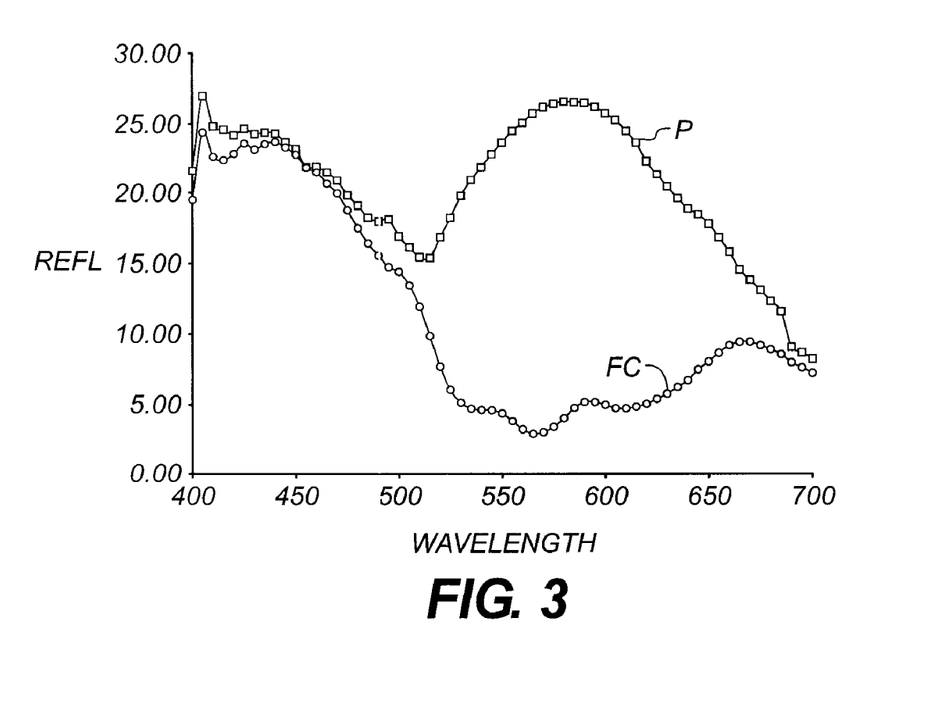
FIG. 3 is a plot of the spectra for a polymer dispersed liquid crystal material having a field blooming color filter layer and a reflective layer.

FIG. 3 is a plot of the spectra for a yellow polymer dispersed cholesteric liquid crystal material with a blue field blooming color filter layer in the focal conic (FC) and planar (P) state. When the cholesteric material is in the planar state, the display appears substantially color neutral. When the display is written into the focal conic state, the display appears blue.

Returning to FIG. 1, field blooming color filter layer 35 overlays cholesteric layer 30. In one embodiment, field blooming color filter layer 35 is composed of pigments that are milled below 1 micrometer to form "nanopigments" in a binder. Such pigments are very effective in absorbing wavelengths of light in very thin (submicrometer) layers. Such pigments may be selected to be electrically inert to prevent degradation interference from electrical display fields applied to display 10. Such pigments are disclosed in U.S. Pat. No. 6,788,362, incorporated herein by reference.

Color filter layer 35 includes a field blooming agent which permits the layer to be both field blooming and color filtering. The layer includes a first set of color filtering particles, comprising one or more nanopigments and submicron transparent particles. The concentration of transparent particles is high enough so that, with the inclusion of the nanopigments, color filter layer is field blooming. Most desirably, the field blooming color filter layer has electrical resistivity greater than 1 mega ohm per square.

Figure 4:
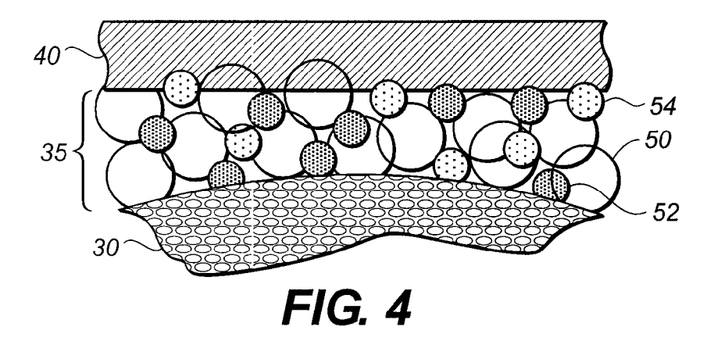
FIG. 4 is a schematic side view of field blooming color filter layer including transparent conductive particles.

FIG. 4 is a schematic side view of field blooming color filter layer 35 including transparent conductive particles. Field blooming color filter layer 35 is disposed between cholesteric layer 30 and second conductor 40. Field blooming color filter layer 35 is comprised of transparent conductive particles 50, first pigment particles 52 and optional second pigment particles 54 held together with a binding agent. In another embodiment, first particles 52 and second particles 54 form a complementary blue filter layer to a yellow cholesteric layer 30. In this embodiment, second conductor 40 is reflective so that a neutral color is produced when cholesteric liquid crystal in cholesteric layer 30 is in the planar state.

Transparent conductive particles 50 are electrically conductive as well as being transparent. It is important that transparent conductive particles 50 have high electrical conductivity and optical transmission. Polythiophene and other organic conductors have lower electrical conductivity than the metal oxides and are poorly suited for the application. Other conductors, such as silver, carbon or aluminum, provide field blooming but have such high light absorbing or blocking characteristics that they also are less suited to this application.

Transparent conductive particles 50 are preferably oxides of indium or tin or combinations of the two metals to form an indium-tin-oxide alloy, conventionally referred to as ITO. Prior art has found that 90 to 95 percent indium in the mixture to a complementary amount of tin provides the best combination of electrical conductivity and optical transparency. Transparent conductive particles 50 are sized to permit high conductivity in thin layers, typically having a size distribution of 200 to 2000 nanometers.

The pigment particles in the field blooming color filter layer are preferably submicron particles of pigments which create a field blooming color filter layer that can act in conjunction with an optional reflective surface to provide complementary light to light reflected by cholesteric layer 30. Complementary refers to the color of reflected light from the color filter layer and the liquid crystal that, when combined, produces a substantially color-neutral reflected light when the liquid crystal material is in planar state. The field blooming color filter layer may contain more than one type of pigment particles. For example, the pigment particles may comprise two or more differently hued pigments. The ratio of the transparent conductive particles 50 to binder content and pigment particles 52 and 54 is controlled so that color filter layer 35 is nonconductive, but field carrying.

In the present embodiment, in FIG. 1, field blooming color filter layer 35 is coated over cholesteric layer 30 to provide a light absorbing layer that provides a specific contrast state to reflected light. As mentioned above, field blooming color filter layer 35 may be designed to provide a specific amount of light at wavelengths not operated on by the cholesteric liquid crystal to create a more color-neutral image. The coating of the field blooming color filter layer may be simultaneous with the deposition of the cholesteric imaging layer 30 or as a separate step.

Figure 5:
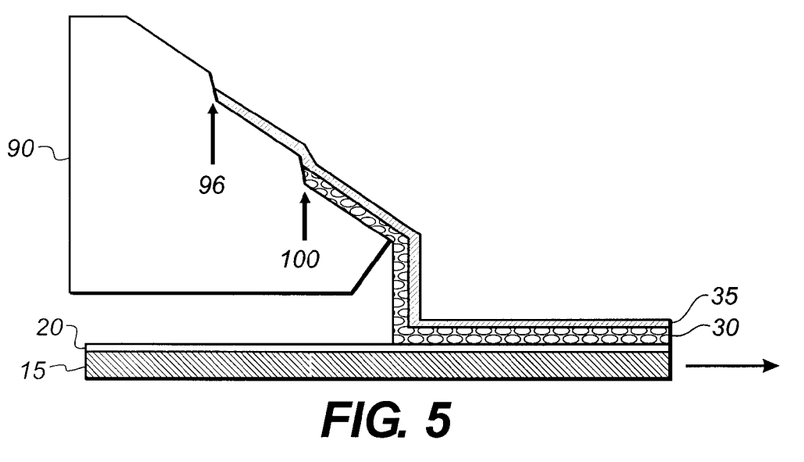
FIG. 5 is a side view of a display being coated in accordance with the invention.

FIG. 5 is a side view of a display being coated in accordance with the invention. In one embodiment, multilayer coating equipment used in the photographic industry provides cholesteric layer 30 and field blooming color filter layer 35 as co-deposited layers. Color filter layer 35 is significantly thinner than cholesteric layer 30 and has minimal effect on the electrical field strength required to change the state of the cholesteric liquid crystal material.

In FIG. 5, substrate 15, having transparent first conductors 20, moves relative to coating block 90. Coating block 90 is a slide coater of conventional design. Fluidized field blooming color filter layer 35 is pumped through a slot 96 and fluidized cholesteric layer 30 is pumped through a slot 100 further down stream. Because the two streams are laminar flow, fluidized field blooming color filter layer 35 lays over fluidized cholesteric layer 30 without mixing. The fluidized layers fall onto transparent second conductors 20 on substrate 15 that is transported relative to coating block 90. The fluid layers may contain gelatin in solution as a binding agent. The gelatin in the layers is chill set and dried simultaneously, creating a set of display layers prepared to receive second conductor 40. Further layers may be deposited simultaneous with the fluidized layers.

Second conductors 40 overlay the field blooming color filter layer or, optionally, the reflective layer 37 overlaying field blooming color filter layer 35. Second conductors in the invention comprise a set of adjacent traces organized to form in conjunction with first conductors 20 to form a matrix display. The gap between second conductors 40 is preferably kept as narrow as possible, while maintaining electrical isolation between adjacent conductors. Second conductors 40, especially for applications requiring complementary light 64, are preferably formed of reflective metal, for example, by vacuum deposition of conductive and reflective material such as aluminum, chrome or nickel. In the case of vacuum-coated second conductors 40, aluminum or silver provide very high reflectance and conductivity. The layer of conductive material can be patterned using well known techniques such as photolithography, laser etching or by application through a mask.

In another embodiment, second conductors 40 may be formed by screen printing a reflective and conductive formulation such as UVAG® 0010 from Allied Photochemical of Kimball, Mich. Such screen printable conductive materials comprise finely divided silver in an ultraviolet curable resin. After printing, the material is exposed to ultraviolet radiation greater than 0.40 Joules/cm$^2$, the resin will polymerize in 2 seconds to form a durable surface. Screen printing is preferred to minimize the cost of manufacturing the display. Alternatively, screen printing a thermally cured silver bearing resin can form second conductors 40. An example of such a material is Acheson Electrodag® 461SS, a heat cured silver ink.

Figure 6:
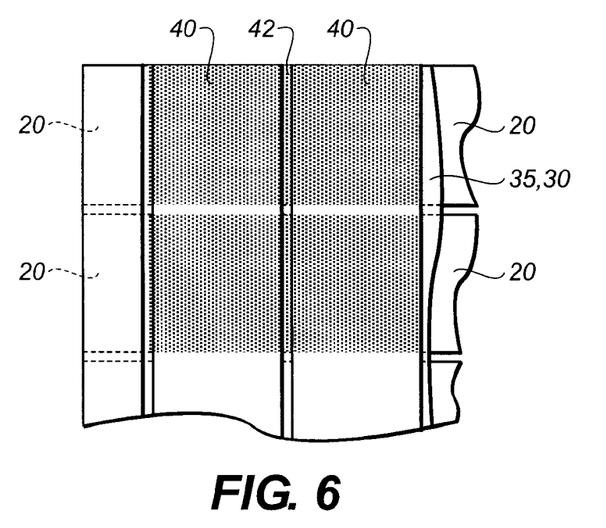
FIG. 6 is a top view of a display having a field blooming color filter layer in accordance with the invention.

FIG. 6 is a top view of a display having a field blooming color filter layer in accordance with the invention. A set of first conductors 20 and second conductors 40 has a cholesteric layer 30 and field blooming color filter layer 35 disposed between the two conductors sets. Field blooming color filter layer 35 in accordance with the invention has field blooming properties. Interconductor area 42 between second conductors 40 is responsive to electrical fields applied by second conductors 40 because of the field blooming property of field blooming color filter layer 35. In FIG. 6, adjacent second conductors 40 and interconductor material 42 have both been written into the dark, focal conic state. The field blooming color filter layer extends the electrical field, applied to transition the imaging layer, over 1 mm from the edge of the first patterned transparent conductor or the second patterned conductor.

Figure 7:
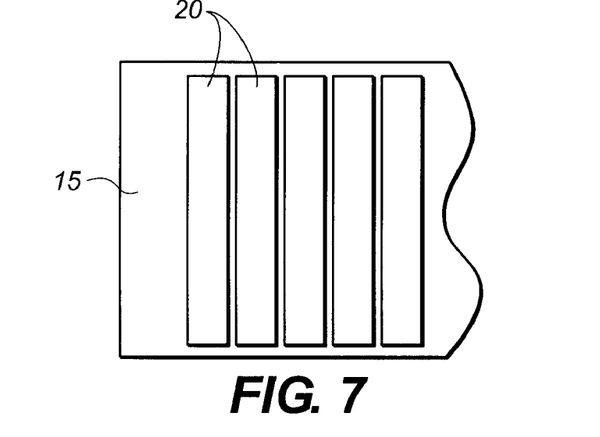
FIG. 7 is a rear view of a sheet in accordance with the present invention having a patterned first conductor.
Figure 8:
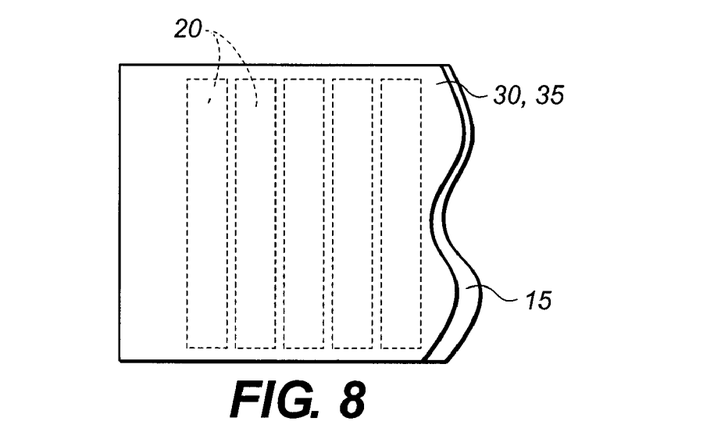
FIG. 8 is a rear view of a sheet in accordance with the present invention having a polymer dispersed cholesteric liquid crystal layer and a field blooming color filter layer.
Figure 9:
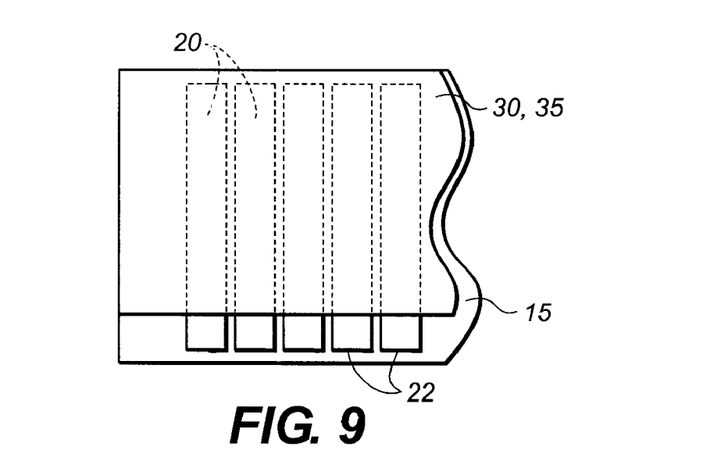
FIG. 9 is a rear view of a sheet in accordance with the present invention having exposed first conductors.

A process for fabricating display 10 will now be described. FIG. 7 is a rear view of a sheet in accordance with the one embodiment of the present invention, which sheet has a patterned first conductor. A substrate 15 is provided with a plurality of patterned first transparent conductors 20. First transparent conductors 20 in the invention comprise a set of adjacent traces organized to form the first set of traces for a matrix display. FIG. 8 is a rear view of a sheet in accordance with the present invention having a polymer dispersed cholesteric liquid crystal layer 30 and a field blooming color filter layer 35 (only field blooming color filter layer 35 is viewable). In one embodiment, cholesteric layer 30 and field blooming color filter layer 35 are co-deposited. FIG. 9 is a rear view of a sheet in accordance with the present invention having exposed first conductors 22. Portions of cholesteric layer 30 and field blooming color filter layer 35 can be removed, for example, using a solvent to form exposed first conductors 22. Alternatively, cholesteric layer 30 and a field blooming color filter layer 35 are deposited in a manner that exposes transparent first conductors 20 to create exposed first conductors 22.

Figure 10:
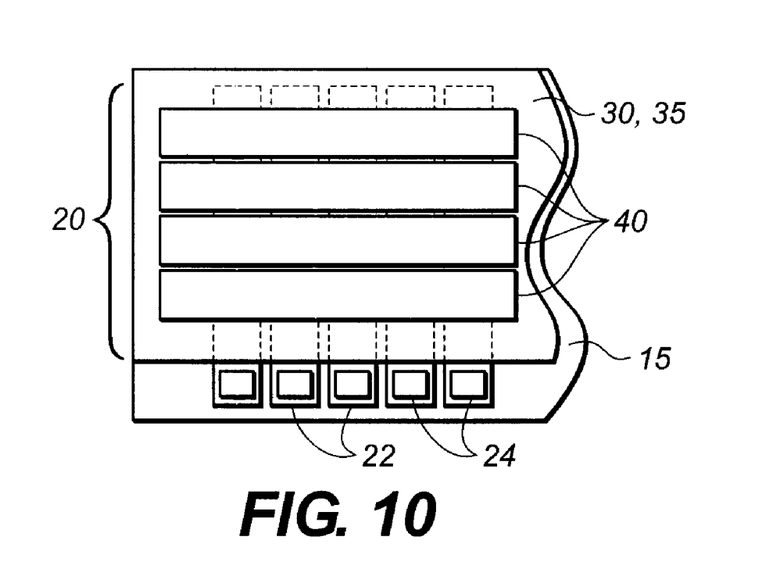
FIG. 10 is a rear view of a sheet in accordance with the present invention having printed second conductors.

FIG. 10 is a rear view of a sheet in accordance with the present invention having applied second conductors 40. Second conductors 40 in the invention comprise a set of adjacent traces organized to form, in conjunction with first conductors 20, a matrix display. Conductive material may be deposited in a vacuum environment and laser etched or conductive material may be selectively deposited, in one embodiment by screen printing, to create second conductors 40. Additional printed material may be applied with second conductors 40 to create protective coverings 24 over each exposed transparent second conductor 22.

Figure 11:
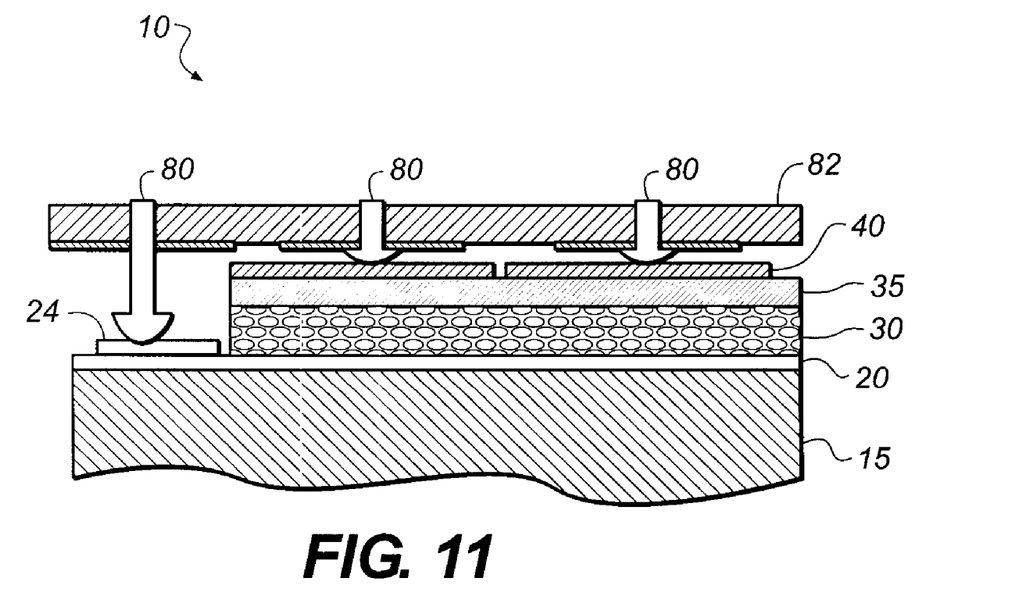
FIG. 11 is a section view of a display in accordance with the present invention attached to a circuit board.

FIG. 11 is a section view of a display in accordance with the present invention attached to a circuit board. Contacts 80 on circuit board 82 provide electrical connection to each second conductor 40 and through protective covering 24 to each second conductor 20.

Figure 12:
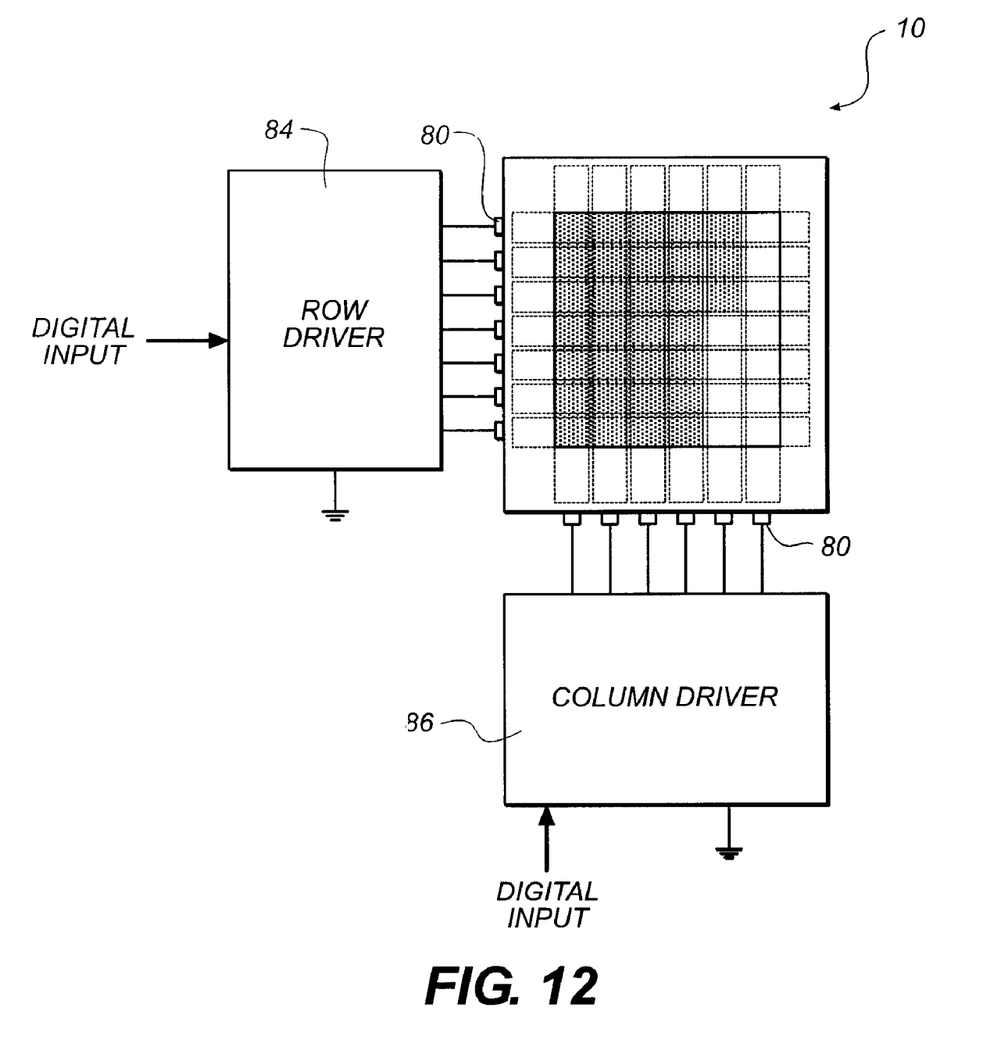
FIG. 12 is a front view of a display in accordance with the present invention connected to electric drive means.

FIG. 12 is a front view of a display in accordance with the present invention connected to electric drive means. Row driver 84 is connected by contacts 80 to second conductors 40. Column driver 86 is connected by contacts 80 to first transparent conductors 20 though protective covers 24. Electrical signals can be applied to row driver 84 and column driver 86 to write images onto display 10 using conventional cholesteric drive schemes.

The following examples are provided to illustrate the invention.

EXAMPLE 1

Comparative

An experiment was performed to determine the optical properties and electrical properties of a submicron indium-tin-oxide powder, 95/5 CITOH "C" from Umicore Indium Products, Providence, R.I. The material, hereafter known as ITO powder, was dispersed in water according to the following formula

| | |
|---|---|
| 5.00 gms. | ITO powder |
| 50.00 gms. | Deionized water |
| 0.10 gms. | Surfynol 131 dispersing agent |

The ITO powder was dispersed using 6 minutes of energy from a Branson Digital Sonifier, Model 450. Kodak deionized photographic gelatin was melted into the solution in the form of 5 grams of swollen gel, having a 40% dried gelatin content, hereafter known as "swollen gel". Three drops of a surfactant, Zonyl FSO, was added to permit the mixture to be wet-coated in thin layers. The mixture was coated at 25 cc per meter over a plastic substrate. The dried film was highly conductive, having a conductivity of 50-200 ohms per square. The film was slightly translucent, but functionally transparent when coated over a reflective surface or layer.

EXAMPLE 2

Comparison

The invention requires a nonconductive layer, and a series of mixtures having progressively less ITO powder were made according to the processes in Example 1 until the following mixture proved to be nonconductive:

| | |
|---|---|
| 1.70 gms. | Submicron Indium-Tin-Oxide powder; Umicore Indium Products 95/5 CITOH "C" |
| 50.00 gms. | Deionized water |
| 0.10 gms. | Surfynol 131 dispersing agent |
| 5.00 gms | swollen gel |

EXAMPLE 3

Comparative

A complementary dye solution appropriate for use with a yellow cholesteric layer to form a color-neutral display was created. Two pigments were used, Sunfast Blue 15:4 milled to a 110 nanometer mean diameter, hereafter known as Kodak cyan, and Pigment violet 29 milled to a 210 nanometer mean diameter, hereafter known as Kodak magenta. Both materials were suspended in water at a 12% concentration.

The following solution provided a non-field blooming color filter layer:

| | |
|---|---|
| 1.00 gms. | Kodak cyan, 12% concentration |
| 2.00 gms | Kodak magenta, 12% concentration |
| 2.80 gms | Kodak gelatin, 40% concentration |
| 44.2 gms. | Deionized water |

The solution was coated over clear plastic at 10.76 grams per square meter and dried. The reflective density for the layer were: Red 2.63, Green 2.77, Blue 1.03.

EXAMPLE 4

Inventive

When pigments were added to mixtures having a ratio of 1.70 ITO powder to 5.00 grams swollen gel from experiment 2, the mixtures did not have field blooming. It appears that the nanopigments reduce the field carrying capacity of the mixture. The amount of ITO powder was increased until the pigment layer was field carrying. A solution suitable for creating a blue filter layer which is field blooming was then formed using:

| | |
|---|---|
| 3.40 gms. | Submicron Indium-Tin-Oxide powder; Umicore Indium Products 95/5 CITOH "C" |
| 40.80 gms. | Deionized water |
| 0.21 gms. | Surfynol 131 dispersing agent |

The ITO powder was dispersed using 6 minutes of energy from a Branson Digital Sonifier, Model 450. The following ingredients were added to the suspension:

| | |
|---|---|
| 2.80 gms. | Kodak gelatin, 35% concentration |
| 1.00 gms | Kodak cyan pigment, 12% concentration |
| 2.00 gms | Kodak magenta pigment, 12% concentration |

The solution was coated over the polymer dispersed cholesteric liquid crystal at 10.76 grams per square meter and dried. The dried layer was less than 0.5 microns thick. The reflective density for the layer were: Red 2.31, Green 2.11 Blue 1.19. The color densities were close to the values obtained for the pigments alone in example 3. The field blooming color filter layer was tested with a voltmeter and found to be electrically nonconductive.

The solution was coated over a polymer dispersed cholesteric layer and a silver electrode was printed over the dried field blooming color filter layer. A field applied to a printed silver electrode activates the cholesteric material 250 microns from the edge of the electrode. From these experiments it was concluded that fine conductive material can be combined with pigments to form a color filter layer having field blooming properties. The formula developed in example 4 provides specific field carrying and optical dye properties. The concentration of transparent conductive particles 50 and pigments 52 and 54 relative to the binder concentration can be varied to provide varying field blooming, color filter and coating properties.

The invention has been described in detail with particular reference to certain embodiments thereof, but it will be understood that variations and modifications can be effected within the spirit and scope of the invention.

| PARTS LIST | |
|---|---|
| 10 | display |
| 15 | display substrate |
| 20 | first conductors |
| 22 | exposed first conductors |
| 24 | protective coverings |
| 30 | cholesteric layer |
| 35 | field blooming color filter layer |
| 40 | second conductors |
| 42 | interconductor area |
| 50 | transparent conductive particles |
| 52 | first pigment particles |
| 54 | second pigment particles |
| 60 | incident light |
| 62 | planar reflected light |
| 64 | complementary light |
| 72 | planar liquid crystal |
| 74 | focal conic liquid crystal |
| 80 | contacts |
| 82 | circuit board |
| 84 | row driver |
| 86 | column driver |
| 90 | coating block |
| 92 | slot for fluidized reflective layer |
| 96 | slot for fluidized field blooming color filter layer |
| 100 | slot for fluidized cholesteric layer |
| P | Planar state |
| FC | Focal Conic state |

The invention claimed is:

1. A display sheet comprising a substrate for carrying layers of material, an imaging layer comprising a bistable polymer dispersed cholesteric liquid crystal imaging layer, a first patterned transparent conductor disposed on one side of said bistable polymer dispersed cholesteric liquid crystal imaging layer, a non-conductive field blooming color filter layer comprising a mixture of transparent conductive particles of oxides of indium or tin or combinations thereof and pigment particles in a binder, and a second patterned electrode on the side of said bistable polymer dispersed cholesteric liquid crystal imaging layer opposite said first patterned conductor, wherein said field blooming color filter layer is disposed between said first patterned transparent conductor and said second patterned conductor.

2. The display of claim 1 wherein said substrate is a flexible transparent substrate.

3. The display of claim 1 wherein said bistable polymer dispersed cholesteric liquid crystal imaging layer has a peak reflectance of 575 nanometers.

4. The display of claim 1 wherein said field blooming color filter layer extends an applied electrical field over 1 mm from the edge of said first patterned transparent conductor or said second patterned conductor.

5. The display of claim 1 wherein said binder is gelatin in solution.

6. The display of claim 1 wherein said transparent conductive particles have a size distribution of 200 to 2000 nanometers.

7. The display of claim 1 wherein said transparent conductive particles are dispersed ITO powder.

8. The display of claim 1 wherein said transparent conductive particle and pigment particles are submicron particles.

9. The display of claim 1 wherein said pigment particles comprise two or more differently hued pigments.

10. The display of claim 1 wherein said field blooming color filter layer operates in conjunction with said bistable polymer dispersed cholesteric liquid crystal imaging layer to form a substantially color neutral reflected light when said bistable polymer dispersed cholesteric liquid crystal imaging layer is in the planar state.

11. The display of claim 1 wherein said field blooming color filter layer forms a complementary blue field blooming color filter layer to a yellow bistable polymer dispersed cholesteric liquid crystal imaging layer.

12. The display of claim 1 wherein said field blooming color filter layer has electrical resistivity greater than 1 mega ohm per square.

13. The display of claim 1 wherein said second patterned conductor is reflective.

14. The display of claim 1 further comprising a reflective layer.

15. The display of claim 14 wherein said reflective layer comprises reflective aluminum particles in a binder.

16. The display of claim 14 wherein said reflective layer comprises at least one fine reflective particle selected from the group consisting of aluminum, titanium, silver, nickel or chromium and combinations, oxides or nitrides thereof.

17. The display of claim 14 wherein said reflective layer is located immediately adjacent to said field blooming color filter layer.

18. The display of claim 1 wherein said first patterned transparent conductor and said second patterned conductor are patterned to produce an addressable matrix display.

19. A method for making a display sheet comprising:
providing a substrate for carrying layers of material;
applying an imaging layer comprising a bistable polymer dispersed cholesteric liquid crystal imaging layer;
applying a first patterned transparent conductor disposed on one side of said bistable polymer dispersed cholesteric liquid crystal imaging layer;
applying a non-conductive field blooming color filter layer comprising a mixture of transparent conductive particles of oxides of indium or tin or combinations thereof and pigment particles in a binder; and
applying a second patterned electrode on the side of said bistable polymer dispersed cholesteric liquid crystal imaging layer opposite said first patterned conductor, wherein said field blooming color filter layer is disposed between said first patterned transparent conductor and said second patterned conductor.

* * * * *